United States Patent
Wang et al.

(10) Patent No.: US 9,024,772 B2
(45) Date of Patent: May 5, 2015

(54) MULTI SENSOR POSITION AND ORIENTATION MEASUREMENT SYSTEM

(75) Inventors: Xianghui Wang, Fremont, CA (US); Wensheng Hua, Fremont, CA (US)

(73) Assignees: Xianghui Wang, Fremont, CA (US); Wensheng Hua, Fremont, CA (US)

( * ) Notice: Subject to any disclaimer, the term of this patent is extended or adjusted under 35 U.S.C. 154(b) by 339 days.

(21) Appl. No.: 13/248,022

(22) Filed: Sep. 28, 2011

(65) Prior Publication Data

US 2012/0075109 A1 Mar. 29, 2012

Related U.S. Application Data

(60) Provisional application No. 61/387,065, filed on Sep. 28, 2010.

(51) Int. Cl.
*G08B 21/00* (2006.01)
*G01C 21/16* (2006.01)

(52) U.S. Cl.
CPC .................... *G01C 21/165* (2013.01)

(58) Field of Classification Search
USPC ........... 340/686.1; 33/319–321; 73/149, 1.38; 367/118; 702/104, 150, 151; 463/37
See application file for complete search history.

(56) References Cited

U.S. PATENT DOCUMENTS

| | | | | |
|---|---|---|---|---|
| 6,636,826 | B1 * | 10/2003 | Abe et al. | 702/151 |
| 7,970,500 | B2 * | 6/2011 | Parra Carque | 701/7 |
| 2005/0038560 | A1 * | 2/2005 | Nagasaka | 700/245 |
| 2007/0032748 | A1 * | 2/2007 | McNeil et al. | 600/595 |
| 2010/0018285 | A1 * | 1/2010 | Murphy et al. | 73/1.79 |
| 2011/0191040 | A1 * | 8/2011 | Bechhoefer et al. | 702/56 |
| 2012/0050095 | A1 * | 3/2012 | Scherzinger et al. | 342/357.3 |
| 2013/0081442 | A1 * | 4/2013 | Basir et al. | 73/1.38 |

OTHER PUBLICATIONS

Wahba's problem, http://en.wikipedia.org/wiki/Wahba's_problem, 1 pg, Oct. 28, 2014.
WGS 84 Earth Gravitational Model, http://earth-info.nga.mil/GandG/wgs84/gravitymod/, Office of Geomatics. Geosciences Division, Apr. 29, 2013, 2 pgs.
International Geomagnetic Reference Field, http://www.ngdc.noaa.gov/IAGA/vmod/igrf.html, WDC for Solid Earth and Geophysics, Jan. 28, 2010, 2 pgs.

* cited by examiner

*Primary Examiner* — Brent Swarthout
(74) *Attorney, Agent, or Firm* — Edward C. Kwok; Hogan Lovells US LLP

(57) ABSTRACT

A system is invented to combine different signals from various sensors together so that an object (such as a car, an airplane etc.)'s position and/or orientation can be measured.

15 Claims, 1 Drawing Sheet

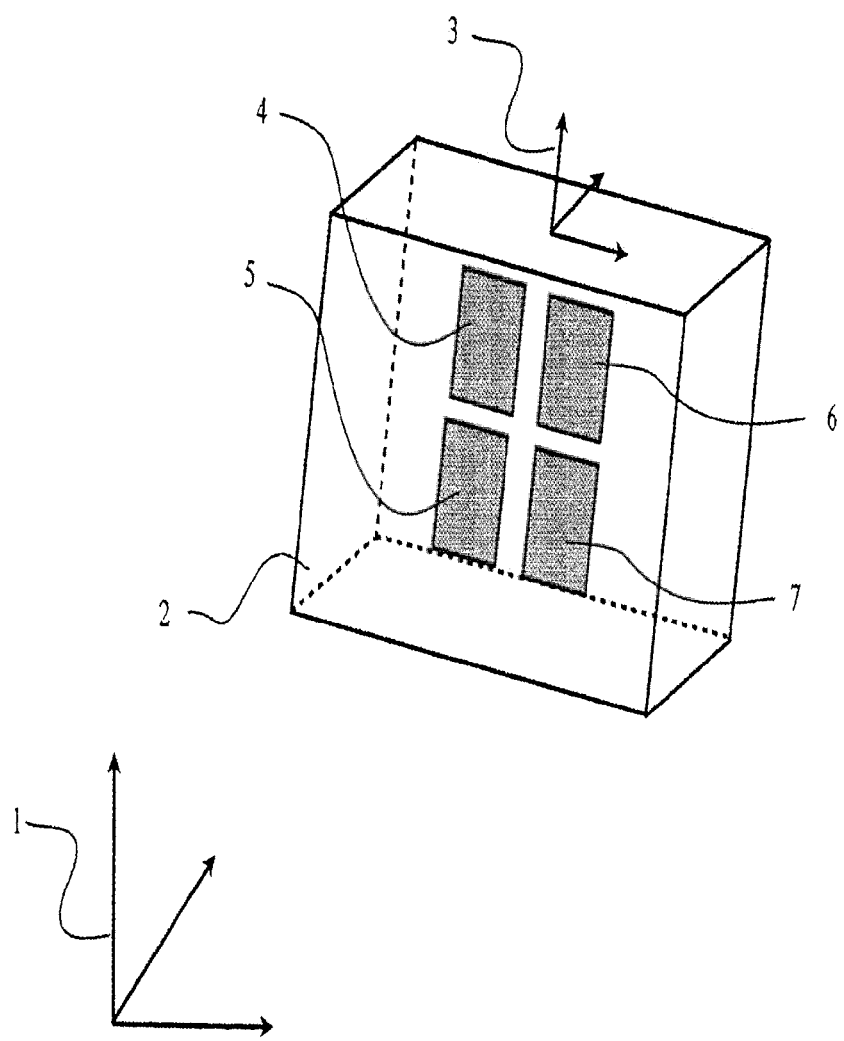

MULTI SENSOR POSITION AND ORIENTATION MEASUREMENT SYSTEM

CROSS REFERENCE TO RELATED APPLICATIONS

The present application is related to, and claims priority of, provisional patent application, entitled: "a multi sensor position and orientation system", with Ser. No. 61/387,065, filed on Sep. 28, 2010. The provisional patent application is hereby incorporated by reference in its entirety.

BRIEF DESCRIPTION OF DIAGRAM

FIG. 1 shows how to multiple sensors on the object.

DESCRIPTION

A device is invented to combine different signals from various sensors together so that an object (such as a car, an airplane etc.)'s position and/or orientation can be measured. The sensors may include translational inertial sensors (such as accelerometers), inertial rotation sensors (such as gyroscopes), absolute angle sensors (such as magnetometers) and absolute position sensors (such as the GPS sensors).

FIG. 1 shows how to put multiple sensors on the object in one of the embodiments. 1 is the earth's referent frame. 2 is the object to whose position and orientation are to be measured. 3 is the object's body frame. 4 the GPS sensor which measures the object's position in earth's reference frame. 5 is 3 dimensional accelerometer which measures the object's apparent acceleration in the object's body frame. 6 is a 3 dimensional gyroscope which measures the object's rotation in the object's body frame. 7 is a 3 dimensional magnetometer which measures the magnetic field in the object's body frame. The sensitive directions of the accelerometer, the gyroscope and the magnetometer should be aligned with the directions of the body reference frame.

In some embodiments of the invention, the signals from the sensors are sent to A2D converter if they are not in digital format already. The digital signals then are send to a computational device such as a computer or alike (such as a DSP chip) to do the calculation.

In some embodiments of the invention, the sampling frequency should be determined following digital signal processing common practice. The sampling frequency should be high enough to avoid aliasing problems. If there are too much high frequency noises from the sensors, low pass filters should be applied before A2D conversion.

Note that in preferred embodiments, digital signal and computers (or alike) are used for the signal processing methods in this invention. However, in some embodiments, analog implementations are possible too following the same principles and algorithms.

In one embodiment of the invention, the absolute position sensor is used to measure the object's position with respect to earth. Since earth's motion is well known the difference between physical inertial space and earth can be easily compensated). The absolute position sensor, such as GPS sensor may have large noise and low data update rates and may not be available all the time. In one of embodiment of the invention, signals from absolute position sensors are combined with signals from inertial sensors such as accelerometers which provide information of the target's position at high frequencies with respect to the object's current position and origination. Since the inertial position sensors and the absolute position sensors do not measure in the same reference frame, in one embodiment orientation(angle sensors) are used to align the two reference frames together. Both inertial and absolute angle sensors can be used. In one embodiment the magnetometers are used to measure the earth's magnetic field thus measure the object's orientation with respect to earth's magnetic field. Other sensors can be used as absolute angle sensor as well.

In some embodiments, the absolute angle sensor does not provide 3 degree of freedom angle measurement needed for aligning absolute position sensor and inertial position sensor. Additional inertial angle sensor such as gyroscopes are used. The object's orientation information can be derived from the accelerometers. If the object's acceleration is small with respect to earth, its accelerometer's output will be approximately earth's gravity g pointing to the center of the earth. The orientation of the object can be estimated by measuring the earth's magnetic field vector (by magnetometers) and gravitational field vector (by accelerometers) in the object's body frame. From these two vectors, the relative angles between the earth's reference frame and the object's origination frame can be derived by solving Wabha's problem. One solution of Wabha's problem can be found http://en.wikipedia.org/wiki/Wahba's_problem.

The accelerometer measure the apparent acceleration of the object in the object's reference frame Its output is the sum of the object's acceleration, denoted as a, with respect to earth and earth's gravitation, denoted as g.

$$A = a + g$$

Here A, a and g are all 3 by 1 vectors.

One can use its output as an estimate of gravitation field and considering the object's acceleration as error. However, when the object's acceleration is large too much orientation error will be introduced. In a preferred embodiment multiple measurements of acceleration are combined together to reduce the error. The acceleration measurements are combined together using the target's rotation information obtained from the rotation sensors. In one embodiment, the rotation information is obtained from gyroscopes. Rotation information from other rotation sensor can be used too.

In a preferred embodiment the acceleration measurement at different time (the object rotates and thus have different orientation and body frame at different time) are aligned together using the relative rotation between them.

$$A_n^r(k) = R_n^k A(k)$$

Here $A(k)$ denotes the acceleration measurement at time sample k. $R_n^k$ denotes the rotation matrix between the object's body reference frame at time sample k and that at time sample n. $R_n^k$ is a 3 by 3 matrix that maps a vector in the object's body frame at time k to the object's body frame at time n. $A_n^r(k)$ denotes the acceleration measurement measured at time k but represented in the object's body frame at time n. $A_n^r(k)$ is also called the aligned measurement. One way of combining them is using a moving average of the aligned acceleration.

$$A_n^c(n) = \sum_{m=0}^{N} w(m) A_n^r(n-m)$$

Here w(m) are weights. This is equivalent to filter the aligned signal with an Finite Impulse Response (FIR) filter with filter coefficients w(m). Another way of combing the aligned Acceleration is to use an Infinite impulse response filter (IIR) filter.

$$A_n^c(n) = \sum_{m=0}^{N_2} w(m) A_n^r(n-m) - \sum_{m=1}^{N_1} u(m) A_n^c(n-m)$$

where w(m) and u(m) are filter coefficients. The advantage of using IIR filters is that it tends to use fewer coefficients and fewer filter states and thus uses fewer number of calculations per second to implement.

Note that the filters here are a little different from the normal digital filters. The filters states are $A_n^r(n-m)$ and/or $A_n^c(n-m)$. We need to rotate the state vectors reference frame when update them:

$$A_{n+1}^r((n+1)-(m+1))=R_{n+1}^n A_n^r(n-m)$$

Where $R_{n+1}^n$ is the rotation matrix from the object's body frame at time sample n to time sample n+1. In one embodiment, $R_{n+1}^n$ is measured by gyroscope directly. The gyroscope measures the rotation speed with respect to the body frame. Denote the output of the gyroscope at time n as $$[r_x(n), r_y(n), r_z(n)]^T$$

Then, the corresponding rotation matrix $R_{n+1}^n$ can be constructed as $$R_{n+1}^n = \begin{pmatrix} 1 & -r_z(n) & r_y(n) \\ r_z(n) & 1 & -r_x(n) \\ -r_y(n) & r_x(n) & 1 \end{pmatrix} T_s$$

where $T_s$ is the sampling time.

The reference frame of state vector $A_n^r(n-m)$ (with index m at time sample n) is rotated to the object's body frame at time sample n+1 and becomes the state vector with index m+1. Similarly, we can update $A_n^c(n-m)$ $$A_{n+1}^c((n+1)-(m+1))=R_{n+1}^n A_n^c(n-m)$$

Note the method of updating filter states applies to both IIR and FIR filters. For notation purpose, denote filtering operation as $$A_n^c = F(A_n^r)$$

where $A_n^r$ is the input of the filter and $A_n^c$ is the output of the filter.

The filters are designed to minimize the orientation error. For example, when linear filters are used, the output of the filter can be represented by $$A_n^c(n) = a_n^c(n) + g_n^c(n)$$

Where $a_n^c(n)$ is the object's acceleration with respect to earth filtered (combined) by the filter represented in the object's body frame at time sample n; $g_n^c(n)$ is the earth's gravity filtered (combined) by the filter represented in the object's body frame at time sample n. In a preferred embodiment, the filter is designed in a way that contributions of gravity at different time are combined together most coherently and contributions of the object's acceleration with respect to earth is combined together most incoherently. Thus, the ratio of the magnitude of an $a_n^c(n)$ and $g_n^c(n)$ is smaller than the ratio of the magnitudes of object acceleration and gravity for the majority of time.

$$\frac{|a_n^c(n)|}{|g_n^c(n)|} < \frac{|a(n)|}{|g(n)|} \text{ for majority of } n$$

If $A_n^c(n)$ is used along the direction of gravity, the angle error due to this assumption is bounded by ratio of the magnitude of $a_n^c(n)$ and $g_n^c(n)$.

$$\text{angle error} < \frac{|a_n^c(n)|}{|g_n^c(n)|}$$

Hence reducing the ratio of the magnitude of $a_n^c(n)$ and $g_n^c(n)$ helps to reduce the orientation error.

There are many ways that filters can be designed so that the ratio of the magnitude of $a_n^c(n)$ and $g_n^c(n)$ can be reduced.

For example, in a situation where the object's average velocity does not change much over time. One of such situation is when an airplane is in cruise mode. The airplane might experience a lot of short term high acceleration events due to air turbulence, but is long term average velocity remains roughly constant. In such situation, one can design a filter that simply sum the aligned acceleration within a certain fixed duration (integration time) of time using an FIR filter.

$$A_n^c(n) = \sum_{m=0}^{N} A_n^r(n-m)$$

i.e the weights w(m)=1.

The integration time defined as $$T = Nt_s$$

where $T_s$ denotes sampling frequency. For example, one can pick the duration as 1000 second.

During that 1000 seconds, the combined(filtered) gravity $g_n^c(n)$ will be approximately 10,000 m/s which is much faster than most air plane can fly. If it is known that the airplane's velocity dose not change more than 100 m/s during 1000 seconds, which means that $a_n^c(n)$ is less than 100 m/s. Hence the orientation error by assuming $A_n^c(n)$ is pointing to gravity's direction is less than 0.01 rad. During this period, the air plane might have short term accelerations as large as 10 m/s$^2$, when that happens, the orientation error can be as large as π.

However, the integration time should not be made too long. The angle measurement has error. For example when gyroscope is used to measure the ration matrix, its error will contribute to the combined signal through the alignment process (or the reference frame rotation process) discussed above. The integration time need to be chosen so that the overall noise can be minimized. A good strategy is to choose integration time so that the two error source's contribution are roughly the same. For example, assume that the object's velocity change is limited by $|a_n^c(n)| < V$. Hence, the orientation error with N samples is then approximately $$\epsilon \approx \frac{V}{Ng}$$

If one more sample is used, change of the error due to larger $|g_n^c(n)|$ is $$\delta_g \epsilon \approx -\frac{1}{N} \epsilon$$

The change of error due to rotation measured by imperfect gyroscope becomes:

$$\delta_r \epsilon \approx \frac{\delta(R_n^{n-N-1})g}{V} \epsilon$$

where $\delta(R_n^{n-N-1})$ is the error of the rotation matrix. Since $\delta(R_n^{n-N-1})g \approx d_r NT_s g$, where $d_r$ is the gyroscope's drift rate measure in unit of rad per second. Hence to minimize $\epsilon$, we need $\delta\epsilon = \delta_r\epsilon + \delta_g\epsilon = 0$, i.e $\delta_r\epsilon = -\delta_g\epsilon$, which means $$N \approx \sqrt{\frac{V}{gd_r Ts}}$$

The integration time can also be determined by simulation. One can write a computer program to simulate the whole system with object's motion, sensor's random noise and the filtering algorithm. Different integration time can be used for different simulation runs. Different motion paths might be used for multiple simulation runs. Simulation can also be repeated multiple times so that random errors of the sensors take different impacts. The integration time that provides lowest average error is selected.

The integration time can also be determined by experiment. If other means of measure the object's orientation is available, (for example a differential radar system) to measure the object's true orientation, then the best integration time can be selected by the one that gives minimum error.

An IIR filter can be used to calculate $A_n^c$ too. For example, a single state IIR filter can be used.

$$A_n^c(n) = (1-u)A_n(n) + uA_n^c(n-1)$$

$0<u<1$, determines the characteristic time of the single pole IIR filter. To have a smaller u is equivalent to have a longer integration time and vise versa. u should be chosen by minimizing the overall error including error contributed by the object's acceleration and the error contributed by rotation measurement errors, similar to the FIR case. u can also be determined by simulation similar to the FIR case. The optimal u can be determined by the one that offers minimum average error in simulation. u can be determined by experiment using other sensors that can measure the true orientation too. The advantage of IIR filter is that it requires much fewer number of states and number of calculations per second.

In an other situation, when it is known that the object's position and velocity are both limited to a certain values. For example, the object is used as an controller in a computer game. The user may swing the controller with a lot of acceleration, but the velocity and the location of the controller are limited. In this case, filters can be used to calculate the integrated distance from the aligned acceleration measurements. One can use a FIR filter like $$A_n^c(n) = \sum_{m=0}^{N} mA_n^r(n-m)$$

Or one can use an IIR filter $$A_n^c(n) = \alpha^2 A_n(n) + 2(1-\alpha)A_n^c(n-1) - (1-\alpha)^2 A_n^c(n-2)$$

It is a order two IIR filter with $w(0) = \alpha^2$, $u(1) = -(1-\alpha)$, $u(2) = (1-\alpha)^2$, $N_1 = 1$, $N_2 = 2$. $\alpha$ determines the characteristic time of the filter. Smaller $\alpha$ means longer equivalent integration time. $\alpha$ can be determined by simulation and/or testing.

$g_n^c(n)$ grows really fast with integration time. For example when the integration time is 100 seconds, $g_n^c(n)$ is approximately 50000 meters. When the object's motion is limited to 100 meter range, the orientation error is around 1/500 rad. The reason is that most of the body acceleration cancel out in the combination process.

In general, the combination (integration) filters can be designed using standard digital filter design techniques. In many situations, the object's aligned acceleration mostly have high frequency components, the error due to rotation measurement error has mostly low frequency components, and the gravity field only has DC components. Typically a low pass filter should be designed that its cut off frequency (roughly equivalent to the inverse of the integration time in above examples) reduces the error caused by the object's acceleration (i.e. allow them to cancel out in the combined signal), but without magnifying the error due to rotation measurement error too much. At the same time, the filter should have a large enough DC gain so that the gravity terms can be added together coherently. The general design procedure by simulation is:

1. measure the noise level of the sensors. It can be done by setting the sensors still and measure the output with a spectrum analyzer.
2. determine a set of simulation paths (including both location and orientation as a function of time) of the object. The path can be established by measuring objects real motion using other sensors. For example measure an airplane's motion by radar systems. The motion can also be constructed by a set of rules. For example a user may walk at speed of 2 meter/s in random direction and swing the game controller with 10 rad/s at random time; the user changes it direction once he hit a wall of a 4 meter by 4 meter room.
3. simulate the physical object with all the sensors using physics laws and the sensor noise and object paths obtained in step 2. Collect all sensor output and the object's real position and orientation. The simulation might need to run multiple times so that the sensors' random noise have different values each time.
4. calculate the signal spectrum densities of $a_n^c$ and error introduced to $A_n^c$ by rotation measurement errors.
5. design a filter that efficiently filter out both error sources in spectrum and have a large enough DC gain using common filter design techniques.
6. apply the designed filter in simulation and test its error level.
7. adjust the filter design (for example cut-off frequency, DC gain etc) and repeat step 5 and 6 until an optimal/desired filter can be obtained.

When absolute position sensors (e.g GPS) are available, orientation measurement error can be further reduced. The absolute position sensors measures the objects motion with respect to earth. One way to use the absolute position information is to construct a matching vector of $A_n^c(n)$ in earth's reference frame, $A_e^c(n)$:

$$A_e^c(n) = a_e^c(n) + g_e^c(n)$$

$a_e^c(n)$ and $g_e^c(n)$ are constructed using the same filter as use in construct $A_n^c(n)$:

$$a_e^c = F(a_e) \text{ and } g_e^c = F(g_e)$$

where $g_e(n) = g$ is a sequence of constant vectors each of them equals gravity; $a_e(n)$ is the object's acceleration measured in earth reference frame. $a_e(n)$ can be obtained by double differentiate absolute position measurement. One way to do the differentiate calculation is by a filter:

$$a_e(n) = [p_e(n) - 2p_e(n-1) + p_e(n-2)]/T_s^2$$

where $p_e(n)$ is the absolute position sensors' output. When the absolute velocity measurement is available directly (for example some GPS sensor provides velocity measurement directly) $a_e(n)$ can be obtained by single differentiate the velocity:

$$a_e(n) = [v_e(n) - v_e(n-1)]/T_s$$

In some embodiments, the combination filter F and the differentiation filter can be combined together. The advantage is that there might be some zeros/poles canceled out which makes the filter implementation easier.

Hence the two vectors $A_n^c$ and $A_e^c$ are measuring the same physical vector in object's body frame and in earth frame.

Earth's gravitational field, mostly pointing downwards, varies slowly as a function of location. Detailed direction around where the object is can be obtained from previous measurements, for example, WGS 84 Earth Gravitational Model http://earth-info.nga.mil/GandG/wgs84/gravitymod/.

One may use this detailed earth gravity field information while calculating the combined gravity $g_e^c$ in earth's reference frame.

Similar techniques can be used with other vector measuring techniques for example magnetometers. Magnetometers can be used to measure the magnetic field around earth. We can construct combined vector by filtering aligned magnetic field measurements in the object's body frame.

$$M_n^c = F(M_n^r)$$

The aligned signal can be calculated the same way as acceleration but from magnetometer's measurements M(k).

$$M_n^r(k) = R_n^k M(k).$$

In the earth frame the combined vector can be constructed in the same way as we construct $g_e^c$:

$$M_e^c = F(M_e)$$

Where $M_e$ is a sequence of constant vectors, each of the vector equals earth's magnetic field.

The circuit around the magnetometer might generate some local magnetic field which causes error. When multiple aligned signal are combined together, the effect of those local fields have a good chance to be canceled out and so the error can be reduced.

The filter used in combining magnetometer's output can be different from the filter used to combine accelerometer outputs. However similar filter design techniques can be applied. The integration time, cut off frequency, DC gain etc. can be designed by similar simulation/testing methods as mentioned above.

Earth's magnetic field mostly point to north. Earth's magnetic field varies slowly as a function of location. Detailed magnetic field direction around the region that the object is can be obtained from previous measurements, for example International Geomagnetic Reference Field, http://www.ngdc.noaa.gov/IAGA/vmod/igrf.html.

Vector measurement might come from other sensors too. For example, from a star tracking system where directions of starts are measured.

With more than two matching vector pairs (each of them contains a pair of vectors, one measured/constructed in the object's body frame and the other measured/constructed in earth frame), the object's orientation in all 3 degree of freedom can be obtained. For example, the matching pairs can be 1, combined acceleration $A_n^c(n)$ in body frame and in earth's reference frame, $A_e^c(n)$; 2 combined magnetic field $M_n^c(n)$ in body frame and in earth's reference frame, $M_e^c(n)$.

One way to do it is:

1, normalize each vector to unit length. Denote the normalized vectors as $v_{n1}$ $v_{n2}$ (the two vectors in body frame) and $v_{e1}$ $v_{e2}$ (the two vectors in earth frame)

2, in body frame, construct a unit vector $v'_{n2}$ that is orthogonal to $v_{n1}$ as linear of $v_{n1}$ and $v_{n2}$ by Gram-Schmidt Process:

$$v'_{n2} = \frac{v_{n2} - (v_{n2} \cdot v_{n1})v_{n1}}{|v_{n2} - (v_{n2} \cdot v_{n1})v_{n1}|}$$

3 unit vector by normalize the cross product of $v_{n1}$ $v_{n2}$ $$v_{n3} = v_{n1} \times v'_{n2}$$

4, construct rotation matrix from the three orthogonal unit vectors $v_{n1}$ $v_{n2}$ $v_{n1}$ $$R^n = [v_{n1}, v'_{n2}, v_{n3}]$$

5, Similar to step 2, 3, 4, construct rotation matrix $R^e$ from vector $v_{e1}$ $v_{e2}$ in earth frame.

6, construct matrix $$R_n^e = R^n (R^e)^T$$

7, matrix $R_n^e$ is the rotation matrix (maps a vector from earth space to body frame) that represent the object's orientation.

Another way to find the object orientation from matching vector pairs is by solving Wahba's problem. http://en.wikipedia.org/wiki/Wahba's_problem. It is a well studied problem and one solution can be found at The Journal of Astronautical Sciences Vol 38 No. 3 July-September 1988, pp 245-258, "Attitude Determination using vector observation and singular value decomposition" by F. Landis Markley.

One advantage of the method listed above is that it used less number of computation. However, the general solution to Wahba's problem offers more accurate results.

Note that in one embodiment of the invention, only accelerometers and gyroscopes are used. They can be used to measure the a downward direction for the object. It self can be useful in some situations. For example, in a system that the object has to be kept level to the earth. Similarly one can measure a north direction on the body from using magnetometer and gyroscopes.

In general, in some embodiments, vector measuring sensors (sensors like accelerometers and magnetometers) and gyroscopes can be used to combine the vectors measured by those sensors together and thus to estimate the object's one or more directions.

In some embodiments, the orientation of the object's body is used to merge the inertial position measurement (as as from accelerometers) in body frame to absolute position measurement of the target (as as from GPS sensors) in earth frame. A more accurate position estimation (better than the absolute position measurement itself) can be obtained.

The acceleration measurement can be casted back to earth frame:

$$A_e(n) = (R_n^e)^T A(n)$$

$A_e(n)$ is also called rebased acceleration for notation purpose.

Then, it can be combined with absolute position measurement, such as by GPS sensors. One way to combine them is to use a set of digital filters.

$$P_c = F_p(p_e) + F_a(A_e)$$

Where $F_p$ and $F_a$ are linear filters applied to position measurement and rebased acceleration respectively.

One way to design $F_p$ and $F_a$ is to use complementary filters. We can design a pair of filters $F_L$ and $F_H$ so that $$F_H + F_L = 1$$

In typical embodiments, $F_L$ is a low pass filter and $F_H$ is a high pass filter.

There are many ways to design complementary filters for example, we can design an analog high pass filter with transfer function $$f_H(s) = \frac{s^2}{\omega_0^2 + 2\eta\omega_0 s + s^2}$$

then $$f_L(s) = 1 - f_H(s)$$

Then construct the transfer function for $F_a$ by multiply a double integrator to $f_h(s)$ $$f_a(s) = f_h(s)\frac{1}{s^2} = \frac{1}{\omega_0^2 + 2\eta\omega_0 s + s^2}$$

Then, $F_a$ can be constructed by digitalize the filter defined by $f_a(s)$. And $F_p$ can be constructed by digitalize $f_L(s)$.

During the design process, $\omega_o$ is the cut off frequency of the low pass and high pass filter. It should be chosen that $F_L$ filter out the high frequency noise of absolute position sensor measurements and $F_H$ filter out the low frequency noise from acceleration and gyroscope measurements. $\eta$ is the quality factor of the filter. Typically we can chose $\eta$ about 0.5 to avoid frequency domain over shoot.

As discussed above, the design of the complementary filters can be done by simulation and testing.

For detailed discussion about how to build complementary filters and how to efficiently calculate FIR filters can be found in Wensheng Hua's phd thesis at Stanford University, Electrical Engineering Dept. 2005, "LOW FREQUENCY VIBRATION ISOLATION AND ALIGNMENT SYSTEM FOR ADVANCED LIGO". One copy can be obtained at http://www.ligo.caltech.edu/~rana/does/Theses/hua_thesis.pdf There are other ways to estimate the object's position and orientation.

In one embodiment of the invention Kalman filters is used to estimate the object's position an orientation. Since the system is nonlinear, an Extended Kalman Filter can be used. Other linearization techniques can be used too. One way to build the Kalman filter is to use the combined vectors as virtual sensors's output. Then the Extended Kalman filter can be built as in common practice. The Kalman filter has a set of states including the object's position (denoted as p) and velocity (denoted as $\dot{p}$) in earth reference frame, the object's orientation (denoted as q) and angular velocity (denoted as $\dot{q}$) measured in earth's reference frame. The orientation can be implemented as cosine matrix or as quaternions. Quaternions are preferred for less computation requirements. p, $\dot{p}$, and $\dot{q}$ are 3 by 1 vectors. Denote the state of the Kalman filter as $$X = \begin{bmatrix} p \\ \dot{p} \\ q \\ \dot{q} \end{bmatrix}$$

For example, the model used can be:

$$\begin{bmatrix} p(n+1) \\ \dot{p}(n+1) \end{bmatrix} = \begin{bmatrix} I & T_s I \\ 0 & I \end{bmatrix} \begin{bmatrix} p(n) \\ \dot{p}(n) \end{bmatrix} + \begin{bmatrix} 0 \\ \omega_p(n) \end{bmatrix} \quad 1)$$

Here $\omega_p(n)$ denotes the amount of random walk per step that the object is assume to take. It should be adjusted to fit how much the object is supposed to move randomly.

$$q(n+1) = C(q(n), \dot{q}(n)T_s) \quad 2)$$

here, function C denotes rotate quaternion q(n) by a rotation defined by $\dot{q}(n)T_s$.

$$\dot{q}(n+1) = \dot{q}(n) + \omega_q(n) \quad 3)$$

Here $\omega_q(n)$ denotes the amount of rotation random walk per step that the object is assume to take. It should be adjusted to fit how much the object is supposed to rotate randomly.

The observation functions are:

Accelerometers: $A(n) = R(q(n))(\dot{p}(n) - \dot{p}(n-1)) + \omega_a(n)$
  $\omega_a(n)$ is the accelerometer noise. $R(q(n))$ is the rotation matrix defined by q(n).
Gyroscope: $r(n) = R(q(n))\dot{q}(n) + \omega_r(n)$ Here $\omega_r(n)$ is the gyroscope noise.
GPS: $p_g(n) = p(n) + \omega_g(n)$ Here $\omega_g(n)$ is the GPS noise.
Magnetometer: $M(n) = R(p(n))M_e + \omega_m(n)$ Here $\omega_m(n)$ is the magnetometer noise. $M_e$ is the earth magnetic field.
Combined Magnetometer $M_n^c(n) = R(p(n))M_e^c(n) + \omega_{mn}(n)$
  Here $\omega_{mn}(n)$ is the noise of the combined signal. The variance of $\omega_{mn}(n)$ might be hard to obtain directly. It can be estimated by simulation.
Combined Magnetometer $A_n^c(n) = R(p(n))A_e^c(n) + \omega_{an}(n)$
  Here $\omega_{an}(n)$ is the noise of combined acceleration. The variance of $\omega_{an}(n)$ might be hard to obtain directly. It can be estimated by simulation.

Note that using magnetometer as part of observation function is optional. Note that smaller Kalman filters can be build to estimate just a subset of the states. For example, one can build to estimate the orientation only without GPS sensor: do not use the position and velocity as state, do not use accelerometer measurement as equation and use $g_n^c(n)$ in place of $A_n^c(n)$.

Details of Kalman filter can be found at http://www.cs.unc.edu/~welch/kalman/.

Details of extended Kalman filter can be found at http://users.ices.utexas.edu/~terejanu/files./tutorialEKE.pdf Details of quaternions algebra is well studied, for example http://www-users.cs.umn.edu/~trawny/Publications/Quaternions_Techreport.htm Another way of building Kalman Filter is to use the combined vectors as state variables.

$$A_n^c(n+1) = \sum_{m=0}^{N_2} w(m)R(q(n))R(q(n-m))^T(\dot{q}(n-m) - \dot{q}(n-m-1))/T_s - \sum_{m=0}^{N_1} u(m)A_n^c(n-m)$$

Node here $R(q(n))R(q(n-m))^T$ is used to calculate $R_n^{n-m}$ and $(\dot{q}(n-m) - \dot{q}(n-m-1))/T_s$ is used to calculate acceleration at time n−m. This provides an other way of construct the combined vector.

Kalman filters provides an efficient recursive way of estimating position and orientation. However it is not the only way.

For example, the orientation information obtained by solving the Wahba's problem provides a good linearization point. The all the noise and error terms' contribution can be considered linear perturbation around such linearization points. Hence one can use maximum likelyhood method to find the global optimal estimation by solving linear equations.

The invention claimed is:

1. A system for measuring a position or an orientation of an object, comprising:
   a first set of sensors comprising one or more sensors providing output signals each representative of a measurement of motion relative to the object's body frame, wherein one or more of the sensors measure at least one vector in the object's body frame, such sensors including one or more rotation sensors; and
   a signal combiner combining the output signals of the first set of sensors over multiple time points, and processing the result of the combination to provide a measurement of velocity, position or orientation.

2. A system as in claim 1, wherein output signals from the sensors that measure at least one vector in the object's body frame are combined together.

3. A system as in claim 2, wherein the output signals from the sensors that measure at least one vector in the object's body frame are combined together after being aligned to a predetermined reference frame.

4. A system as in claim 3, wherein the output signals from the sensors that measure at least one vector in the object's body frame are combined together after aligning the measured vectors at the multiple time points to the object's body frame at a predetermined time.

5. A system as in claim 4, wherein the combined output signals are processed in the signal combiner to determine the orientation.

6. A system as in claim 5, wherein the position is also obtained.

7. A system as in claim 6, further comprising a second set of sensors comprising one or more sensors providing output signals representative of measurements of the velocity, the position or the orientation relative to a global reference frame, wherein the position is obtained by combining a position obtained from the output signals from sensors in the first set of sensors and one or more positions obtained from the output signals of sensors in the second set of sensors.

8. A system as in claim 6, wherein the position is obtained by combining a position obtained from the output signals from sensors in the first set of sensors rotated to align with the global reference frame and a position obtained from the sensors in the second set of sensors in the global reference frame.

9. A system as in claim 7, wherein the position combination is performed using a recursive update filter.

10. A system as in claim 9, wherein the recursive update filter comprises a Kalman filter.

11. A system as in claim 9, wherein the recursive update filter uses at least one combined aligned vector as a state variable.

12. A system as in claim 3, wherein the sensors that measure at least one vector in the object's body frame comprise accelerometers.

13. A system as in claim 4, wherein the sensors that measure at least one vector in the object's body frame comprise accelerometers.

14. A system as in claim 1, wherein the measurement of motion comprises a measurement of acceleration.

15. A system as in claim 1, wherein the rotation sensors comprise one or more gyroscopes.

* * * * *